Jan. 13, 1959  C. M. NEHER ET AL  2,868,852
OIL SCRUBBER
Filed Oct. 25, 1956
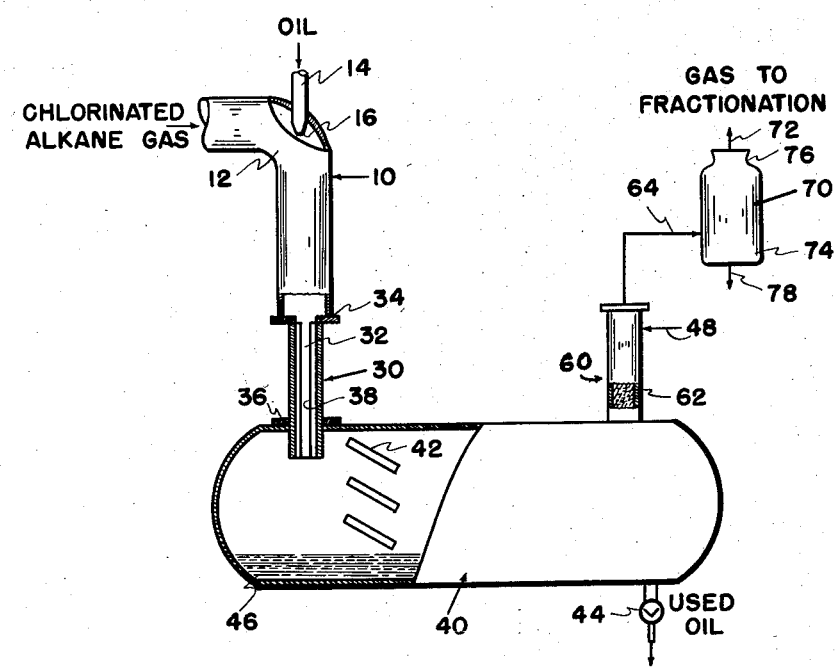

United States Patent Office 2,868,852
Patented Jan. 13, 1959

2,868,852
OIL SCRUBBER

Clarence M. Neher and Harry E. O'Connell, Baton Rouge, La., assignors to Ethyl Corporation, New York, N. Y., a corporation of Delaware Application October 25, 1956, Serial No. 618,219

3 Claims. (Cl. 260—660)

This invention relates to the treatment of chlorinated hydrocarbons and more particularly but not exclusively to the removal of finely divided carbon from chlorinated alkanes.

Several chlorinated alkanes are produced commercially, such as methyl chloride, methylene chloride, carbon tetrachloride, and ethyl chloride. These products have a large number of uses. The chlorine derivatives of methane are used as industrial solvents. The principal use of ethyl chloride is as an intermediate in the manufacture of tetraethyllead. All of the chlorinated alkanes can be produced by thermal chlorination of the corresponding alkanes, generally at temperatures above about 250°–300° C. and frequently up to about 600° C. Under these conditions some of the hydrocarbon is decomposed to carbon which is entrained as a fines in the gaseous reaction product. This carbon tends to plug the product recovery equipment and, thus, requires frequent plant shutdowns and appreciable plant maintenance.

It is accordingly an object of this invention to provide a process for removing finely divided carbon from gaseous chlorinated alkanes. A more specific object is to provide an improved means for removing carbon from chlorinated ethane reaction products in which the principal product is ethyl chloride. Another object is to provide a process which is adaptable for commercial use, i. e., capable of economical and troublefree use in large volume production of chlorinated alkanes. Other objects and advantages of the invention will be apparent from the following description and appended claims.

It has now been found that finely divided carbon can be eliminated from chlorinated hydrocarbon gases, or materially if the gaseous chlorinated hydrocarbon is intimately contacted with a paraffin hydrocarbon oil which is relatively non-volatile by simultaneously passing a mixture of the chlorinated hydrocarbon gas and the oil from a first flow zone to a second contacting zone having a restricted cross sectional area whereby the fluid is subjected to a substantial pressure reduction. The purified gas can thereafter be separated from the oil by phase separation.

More particularly, the preferred process comprises passing the fluid mixture through a contacting zone in which the fluid flow path is essentially instantly reduced, i. e., the flow path is reduced in cross sectional area by at least 3 square units of area per unit of linear flow, and preferably at a rate of at least 8 square units of area per unit of linear flow. At the same time, the velocity of fluid flow through the contacting zone should be at least 20 feet per second, and preferably is greater than 90 feet per second. In a simple and convenient embodiment of the invention, the liquid-gas mixture is passed through a zone comprising pipe sections of different diameters, joined without any material bevel, so as to form a sharp or sudden reduction in the cross-sectional area of the fluid flow zone. The pressure reduction in the contacting zone should be at least 1.8 p. s. i.

The removal of carbon by the oil in the process of this invention is unexpected and unusually effective. Although the carbon entrained in the gaseous product is extremely finely divided, the oil essentially completely eliminates the carbon from the gases. The carbon can thereafter be readily separated from the oil, if desired, such as by filters and other separatory apparatus. In contrast, merely contacting the gas with oil in a tower or similar apparatus is unsatisfactory, apparently due to the difficulty in obtaining adequate wetting of the carbon by the oil.

The paraffin oil should be relatively non-volatile under processing conditions and thus should have a boiling point above about 300 °F., preferably above 400° F. Although very high boiling oils are desirable, i. e., above about 500° F., such oils frequently have excessively high viscosities. In general, the oil should have a viscosity not greater than about 20 centipoises at process conditions, and preferably should have a viscosity of between 6–15 centipoises. Generally, oils are suitable which have viscosities as low as 2 centipoises. The oil should also be essentially inert to reaction with the gas, particularly hydrogen chloride formed in the chlorination reaction. Thus, a highly saturated paraffin oil is preferred. Thus, mixtures of oils boiling in the above temperature range can be employed if only relatively small quantities of unsaturated impurities are present in the mixture. Pure paraffins are also suitable, such as those having from about 10–16 carbon atoms.

Reference is now made to the drawing in which is shown one embodiment of a gas scrubbing apparatus for carrying out the process of this invention. The figure is an elevational view, partly in section. A feed pipe 10, through which a chlorinated alkane gas to be treated is fed, is connected to a reduced diameter pipe 30, forming a gas-liquid contacting zone 32. The pipe 30, extends into one end of a gas-liquid separator 40 which has a volume sufficient to materially reduce the velocity of the fluid ejected through the pipe 30. A packed tower 60 is positioned at the opposite end of the gas separator 40 which is in turn connected by line 64 to a knockout drum at a point spaced from the bottom thereof. An overhead line 72 is provided at the top of the knockout drum for flow of the scrubbed gases to recovery equipment (not shown), such as fractionators, distillation columns, stabilizer columns and the like.

The feed pipe 10 is shown having a curved section 12 which permits securing a nozzle 14 thereto for injection of oil into the gas in the direction of the gas flow. The nozzle has a restricted opening 16 such that the oil is sprayed into the gas and is broken up immediately into small droplets.

The reduced pipe 30 is provided with a flange 34 which is secured to the lower end of the feed pipe 10 and provides a sharp reduction in cross section of the fluid flow, the reduction in area being effected with essentially no taper, i. e., the rate of change of cross sectional area to linear flow being essentially infinite. The reduced pipe 30 is also provided with a collar 36 for securing and sealing the pipe to the gas-liquid separator 40. A lining 38 is employed in the pipe 30 constructed of corrosion-resistant material, such as nickel alloys, to minimize deterioration due to corrosion by the gas-liquid fluid and due to wear caused by high velocities through the contacting zone 32.

The gas-liquid separator 40 is provided with a series of angularly positioned baffles 42 disposed between the exit end of the reduced pipe 30 and the packed tower 60. These baffles prevent entrainment of large quantities of liquid with the gas and tend to smooth out the flow of gas to the packed tower 60. The gas-liquid separator is also provided with a drain, controlled by a valve 44, through which the used oil can be discarded from the system or from which a quantity of the used oil 46 can be recycled to the nozzle 14 for reuse in the process.

The packed tower 60 is a vertical column having a packing 62 to provide a surface upon which oil mist or droplets can collect and return to the separator 40. A wide selection of packing material is suitable. Typical examples of suitable packing are metals, such as steel or other metal wool, glass, e. g., in the form of beads or fiber, ceramics, e. g., Raschig rings, silica gel, sand, gravel or the like. The tower 40 is also provided with a feed line 48 near its top through which oil, e. g., used oil 46, or other media can be sprayed to additionally scrub the gases.

The knockout drum 70 is a vertical tank which is connected to the tower 60 by the line 64. The drum has a lower open section 74 in which liquid oil collects, and an upper packed section 76 for removing any remaining oil mist from the gases. A drain line 78 is provided at the bottom of the drum to remove oil which collects in the lower section 76. The packing for the upper section can be of any of the materials useful in the tower 62, discussed above.

In operation, a gas to be treated flowing in feed pipe 12 is mixed with oil which is sprayed into the pipe 12 through nozzle 14. The gas velocity in the pipe approaching the reduced pipe 30 is generally at least 10 feet/second and preferably is above 30 feet/second. The oil is normally subjected to a sufficient pressure reduction over the nozzle 14 to effect dispersion or atomization of the liquid stream, i. e., at least 5 p. s. i. and preferably above 40 p. s. i. The velocity of the oil upon ejection should be about equivalent to the gas velocity, unless apreciable excess gas pressure is available.

The pressure reduction of the fluid mixture through the contacting zone 32 should be, as noted above, at least 1.8 p. s. i. and preferably is at least 3 p. s. i. Normally, no greater pressure reduction than 20 p. s. i. is necessary or desired. The pressure reduction depends upon the suddenness of the pressure reduction, the length of the contacting zone, the velocity of the fluid flow and the ratio of the volume of gas to liquid. As noted above, a sudden change in the fluid flow path is desired, creating essentially a shock on the fluid mixture. The length of the contacting zone should be sufficient to provide a pressure reduction essentially equivalent to the pressure reduction due to the change in fluid flow path, i. e., at least a length equivalent to two diameters of the contacting zone and preferably greater than about 4 diameters. The volume of oil can be as low as about 2 gallons/1000 cubic feet (actual) of gas but preferably should be above about 100 gallons/1000 cubic feet of gas.

The intimate gas-liquid mixture is dispelled into the gas-liquid separator wherein the large bulk of liquid is separated from the gas and settles to the bottom of the separator, where it can be withdrawn through the valve 44. The gas then passes through the packing 62 in the tower 60, the major quantity of entrained liquid condensing or otherwise collecting on the packing surface and returning by gravity to the separator 40. In some instances, additional oil or other liquid is injected into the tower through the line 48 to scrub the gas. The gas stream then passes through the line 64 into the knockout drum 70 wherein any remaining oil vapor or mist is separated from the gas and settles to the bottom of the drum where it can be withdrawn through the drain 78 and returned, if desired, to the process. The overhead from the drum is removed through line 72 and processed or used in any desired manner.

The present invention is useful in the treatment of any chlorinated alkane hydrocarbons which contain entrained carbon fines and is particularly useful with gas mixtures which are produced by thermal chlorination. Generally, chlorinated alkanes having up to about 20 carbon atoms and having one or more chlorine atoms can be successfully treated by the process of this invention. Specific examples are methyl chloride, methylene chloride, chloroform, carbon tetrachloride, ethyl chloride, 1,1-dichloroethane, 1,2-dichloroethane, the trichloroethanes, the tetrachloroethanes, pentachloroethane, propyl chloride, propylene dichloride, the trichloropropanes, the tetrachloropropanes, the butyl chlorides, the hexyl chlorides, octyl chlorides, tetradecyl chlorides and mixtures of the above. Other hydrocarbon chlorides can also be treated in accordance with this invention, which compounds tend to pyrolyze at elevated temperatures or contain carbon.

In a specific example of this invention covering several days operation, a chlorinated alkane feed gas having varying quantities of carbon is passed into conduit 10 and is therein mixed with an oil boiling between 400°–450° F. and having a viscosity of 10 centipoises at 250° F., entering through nozzle 12. The gaseous mixture contains Component:
  Ethane_____ 53 mole percent.
  Hydrogen chloride_____ 24 mole percent.
  Ethyl chloride_____ 20 mole percent.
  Ethylene dichlorides and
    others_____ 3 mole percent.
  Carbon_____ 0.007–0.316 grain/s. c. f.

The oil is fed at a rate of 57,000 parts/hour. The gas is fed at a rate of 20,061 parts/hour. A weight ratio of oil to total gas of 2, 3 and 5 gives similar results. The scrubbed gas mixture in all cases contained no solid entrained carbon.

The ethyl chloride gaseous product above was produced in a thermal chlorination process, conducted in a fluidized bed reactor. Sand was employed as the fluidizing media. The temperature of the reactor was 760° F. and the pressure was 90 p. s. i. g. A chlorine to ethane feed mole ratio of 0.3 was employed. Other ratios give similar results with the present process, e. g., 0.2 and 0.6. The gas had a superficial linear velocity through the reactor of 1.6 F. P. S. The sand bed had been used for 41 hours at the beginning of the test. The carbon formation is maximum in the first few hours of use and thus the above conditions illustrate essentially steady-state conditions. However, the oil scrubbing technique and conditions discussed above will readily remove all the carbon fines, even during startup with a fresh catalyst bed.

The above example illustrates the oil scrubbing technique of this invention with chlorination of ethane to produce ethyl chloride. The products of more complete chlorination of ethane, i. e., the dichloroethanes and trichloroethanes, can be likewise treated to remove entrained carbon. In general, more pyrolysis is experienced with such processes due to high chlorine concentration and the resultant tendency of localized overheating. Similarly, chloromethanes, chloropropanes, and chlorobutanes can be treated as above with similar results. The higher alkanes pyrolyze even more readily than ethane and appreciably larger quantities of entrained carbon are noted even when they are impurities in a predominantly ethane feed.

While the present process has been discussed primarily in connection with the reaction product of a process employing a fluidized bed, this invention finds utility in combination with other reactors or process conditions. In particular, the chlorination can be carried out in a pipe or tube reactor, preferably having baffles to provide back-mixing so that the heat of reaction will maintain reaction initiation. In fact, the present process has an added advantage in such processes since even greater quantities of carbon is formed using such techniques. Also, the example relates to the manufacture of a mono-chlorinated product, i. e., ethyl chloride, in which a chlorine/alkane mole ratio of from about 0.2 to about between about 0.6 is desired. However, the formation of higher chlorinated alkane derivatives, with chlorine/ alkane mole ratios of between about 0.6–6.0 or even higher, form even greater quantities of finely divided carbon and, thus, the present process has at least equal applicability and desirability to processes of this type.

We claim:

1. In a thermal alkane chlorination process in which the gaseous reaction product is contaminated with finely divided carbon, the improvement comprising intimately contacting said gaseous product with a paraffin hydrocarbon oil by simultaneously passing said gaseous product and oil through a contactnig zone having a restricted cross sectional area whereby the fluid is subjected to a pressure reduction of at least 1.8 p. s. i., and thereafter separating the gaseous product from the oil containing the carbon.

2. The process of claim 1 wherein said gaseous product is mixed with said oil prior to being subjected to said pressure reduction.

3. The process of claim 2 in which the fluid flow path of said gas and said oil is essentially instantly reduced.

References Cited in the file of this patent

UNITED STATES PATENTS

| | | |
|---|---|---|
| 2,014,044 | Haswell | Sept. 10, 1935 |
| 2,183,046 | Reilly | Dec. 12, 1939 |